April 7, 1953     J. H. MURPHY     2,634,165
SPRAYING APPARATUS

Filed April 11, 1951     4 Sheets-Sheet 1

INVENTOR,
John H. Murphy.
BY
E. E. Vrooman & Co.,
ATTORNEYS.

April 7, 1953  J. H. MURPHY  2,634,165
SPRAYING APPARATUS
Filed April 11, 1951  4 Sheets-Sheet 2
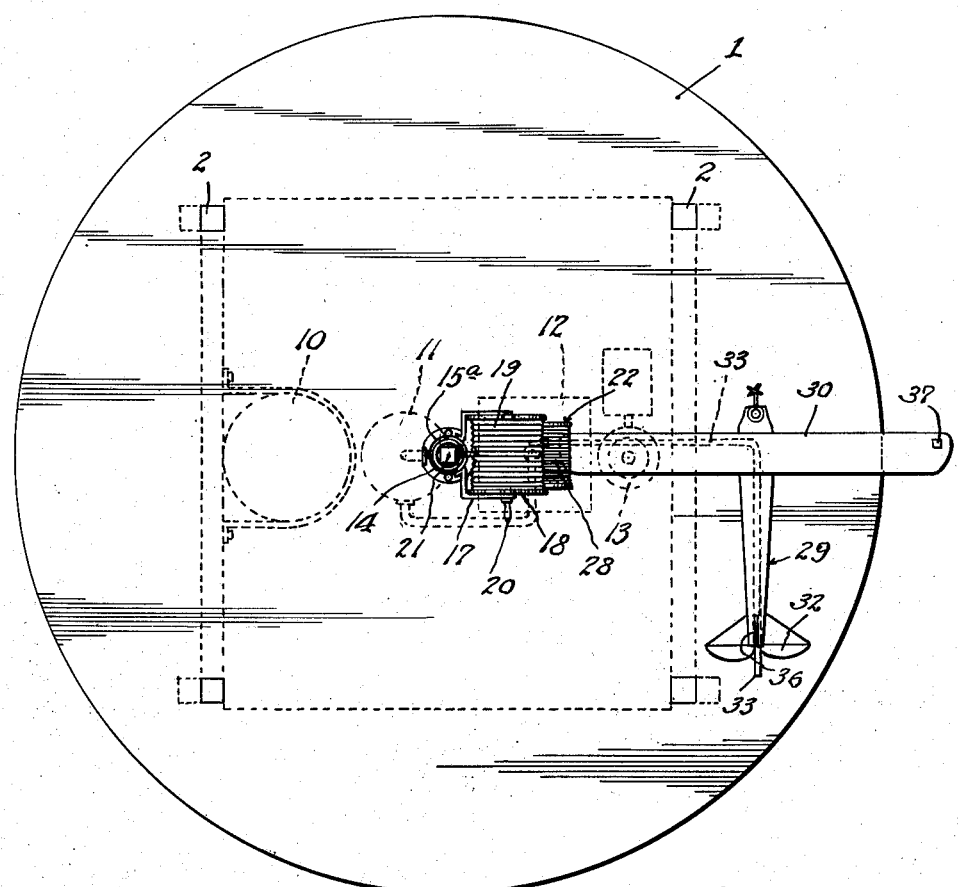
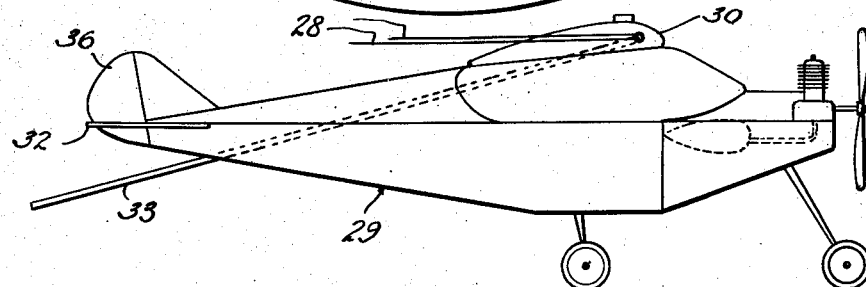
INVENTOR,
John H. Murphy.
BY
E. E. Vrooman & Co.,
ATTORNEYS.

April 7, 1953 J. H. MURPHY 2,634,165
SPRAYING APPARATUS
Filed April 11, 1951 4 Sheets-Sheet 3
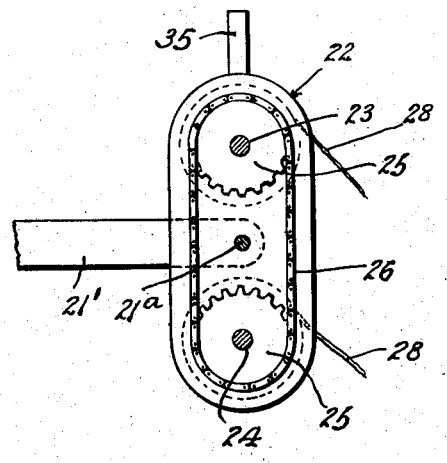
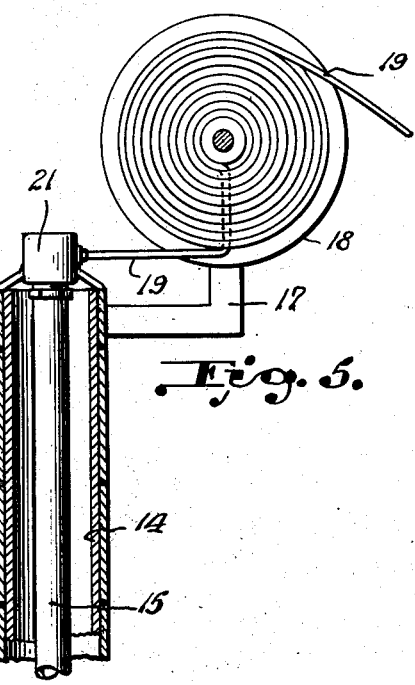
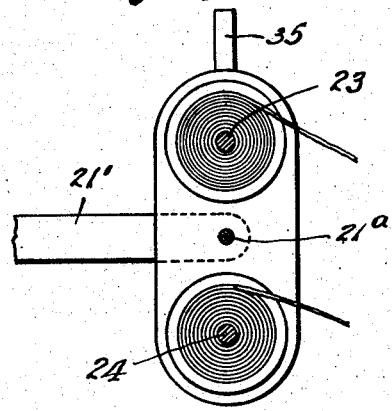
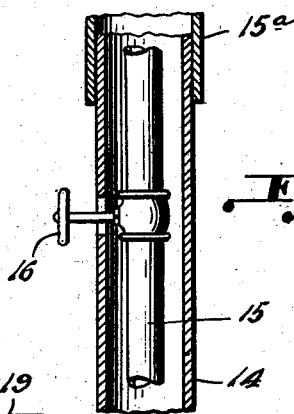
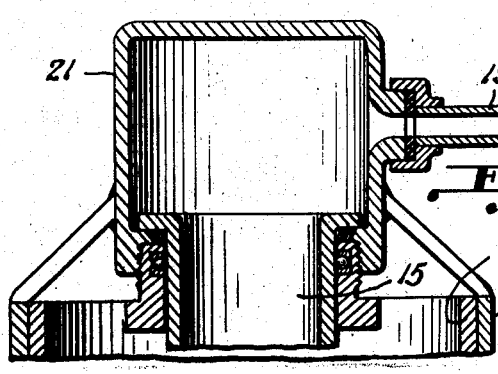
INVENTOR,
John H. Murphy.
BY
ATTORNEYS.

April 7, 1953  J. H. MURPHY  2,634,165
SPRAYING APPARATUS

Filed April 11, 1951  4 Sheets-Sheet 4

INVENTOR,
John H. Murphy.
BY
E. E. Vrooman & Co.,
ATTORNEYS.

Patented Apr. 7, 1953

2,634,165

UNITED STATES PATENT OFFICE 2,634,165

SPRAYING APPARATUS

John Holmes Murphy, Gadsden, Ala.

Application April 11, 1951, Serial No. 220,491

6 Claims. (Cl. 299—38)

This invention relates to a spraying apparatus.

An object of this invention is to combine an efficiently supported deck or platform, an airplane, control means and supply means in producing a new and useful spraying apparatus.

Another object of this invention is to produce an efficient spraying apparatus for placing a spray of liquid or powder over terrain to fertilize agricultural crops, and/or control pests, etc. of all types, especially those affecting citrus trees and cotton plants.

A still further object of this invention is the production of a spraying apparatus which is more economical than a conventional or man-carrying airplane; also in addition it may fly in congested areas of trees and cover remote areas with the desired spray; it may also spray hillside crops by the operator forcing the airplane to fly over the contour of the hill.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 2 is a top plan view.

Figure 3 is a fragmentary view partly in sections showing particularly the control reel, while Figure 4 is another sectional view thereof.

Figure 5 is a fragmentary view, partly in section, and showing particularly the hose reel.

Figure 6 is a fragmentary sectional view of the hollow standard and the supply pipe therein.

Figure 7 is an enlarged sectional view of the rotary ball-bearing connecting device.

Figure 8 is an enlarged view in side elevation of the miniature airplane of this invention.

Figure 12:
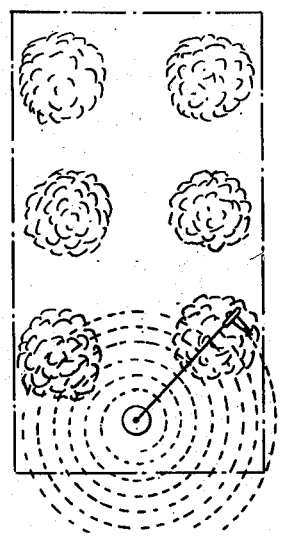
Figure 12 is a diagram of rows of trees with the apparatus positioned to travel between the rows.
Figure 13:
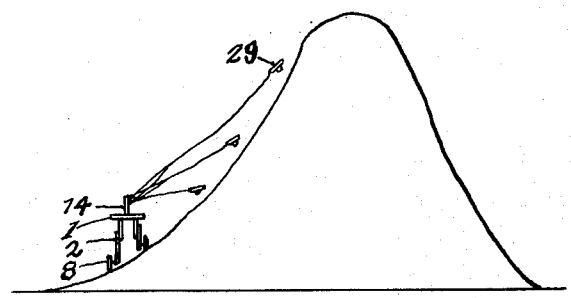
Figure 13 is a diagram of a hill and illustrating the manner of applying this apparatus for treating the surface of the hill.

Referring to the drawings in which the preferred embodiment of this invention is illustrated, 1 designates a platform or deck which is preferably circular in shape. The deck 1 is supported by adjustable sectional legs 2. Each leg 2 comprises an upper section 3 and a lower section 4. These sections are provided with apertures 5, dotted lines, in which are placed fastening means 6, whereby the sections of the legs 2 can be adjusted to suit conditions, such as shown in Fig. 12, and then retained in the adjusted position. The legs 2 are preferably fastened to the bottom of the deck 1 by means of angle brackets 7, Fig. 1. Wheels 8 are suitably attached to the lower sections 4 whereby the deck 1 is wheeled to different positions. An auxiliary platform 9 is mounted on the upper sections 3 directly under the deck 1. On the auxiliary platform 9 is mounted a powder or liquid tank 10, a pump 11, a compressor or air tank 12 and a motor 13.

Secured to the top of the deck 1 is a hollow standard 14. A supply pipe 15 extends through the hollow standard 14 and is connected at its lower end to the pump 11. A spray valve 16 (Fig. 6) is on the supply pipe 15. A ball-bearing sleeve 15a is mounted on standard 14. A bracket 17 is fastened to the side of the rotary sleeve 15a. Mounted on the bracket 17 is a hose reel 18 on which is coiled a hose or supply tube 19. A handle 20 is on the hose reel 18 whereby the operator can control the winding in or playing out the hose 19 as desired. The hose 19 is connected by a rotary ball-bearing connecting device 21 to the outer end of the supply hose or pipe 15 (Fig. 7). Therefore, it will be seen that when the operator desires, he can cause powder or liquid to be passed through the supply pipe 15.

A bracket 21 is fastened to the side of the rotary sleeve 15a and pivotally mounted at 21a is a control reel 22. The control reel 22 is provided with an upper drum 23, and a lower drum 24. Fixedly secured to these drums 23 and 24 are sprocket wheels 25. A sprocket chain 26, Fig. 3, is mounted on said wheels 25 whereby when the crank 27 is rotated, the drums 23 and 24 will be rotated to wind the control means 28, which are shown as wires, thereon or to feed them outward to control the miniature airplane 29. This airplane is provided with a wing 30. The control wires 28, Fig. 8, preferably extend to the bell cranks 31 which bell cranks are connected to the stabilizers 32. A supply tube 33 extends partly through the wing 30 and its outer end projects beyond the rear of the airplanes as shown in Figure 8. Hence, liquid or powder passing through the supply tube 33 is discharged as the airplane travels over the surface to be treated. It is understood that the supply hose 19 is connected at 34, Fig. 8, to the supply tube 33.

Figure 1:
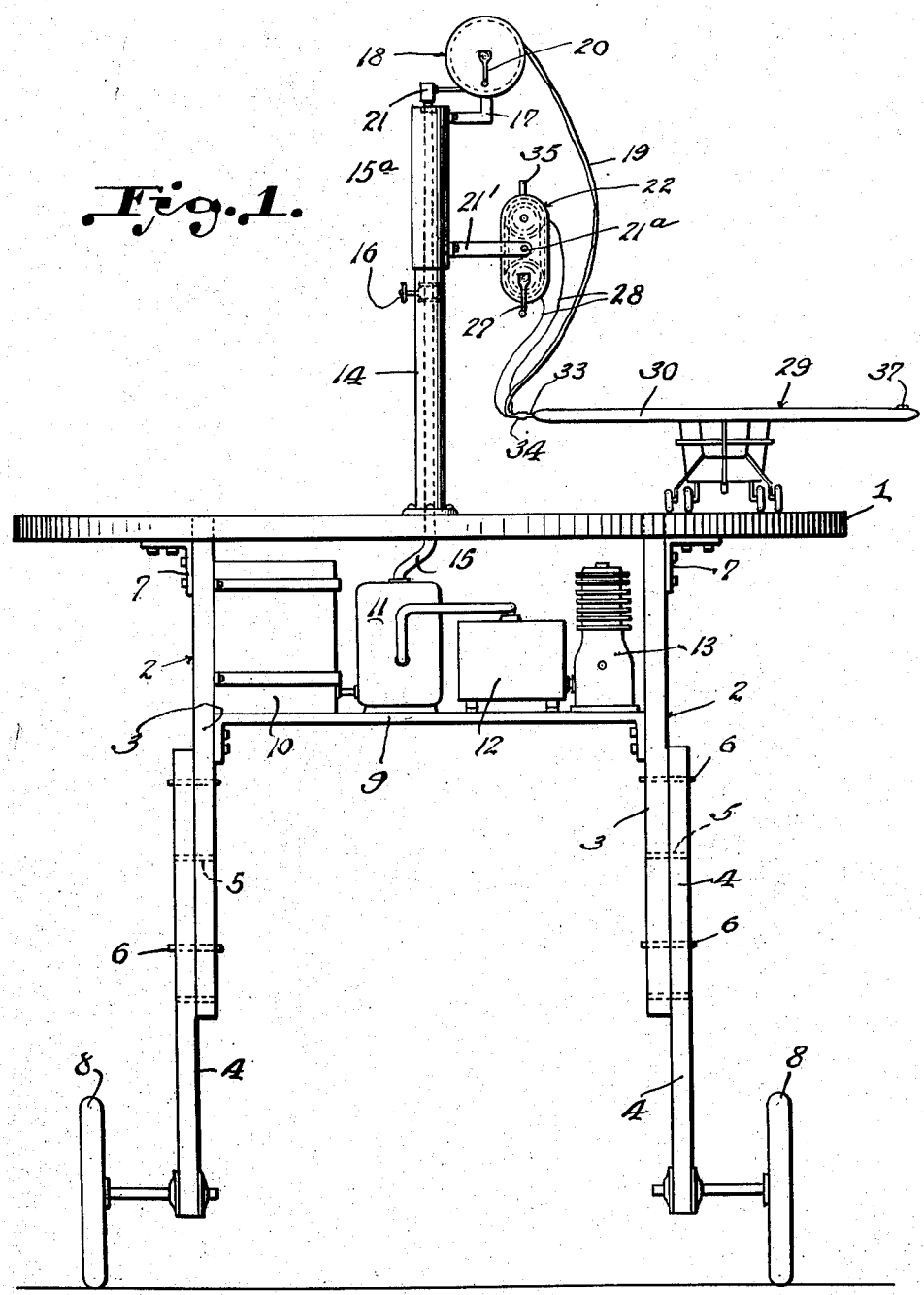
Figure 1 is a view in front elevation of an apparatus constructed in accordance with this invention.

A grip 35 is fixedly secured to the upper end of the control reel 22 whereby when the operator desires the airplane 29 to climb, he will apply pressure on the grip 35 to pull the control wire and thereby make the airplane climb, or by swinging the control reel in an opposite direction the airplane will be caused to moved downward. It is to be understood that there is no rudder control, but only stabilizer control. The rudder 36 is set an an angle to cause the airplane to have a tendency to fly away from the deck 1. To counterbalance the attaching of the supply tube 19 and the control wires 28 to one end of the wing 30, a counterbalance weight 37 is fastened to one end of the wing 30, as shown in Figure 1.

To start the operation of the apparatus, the operator assumes his position at the hollow standard 14, so that he can readily reach the grip 35 and the handle 20, while an assistant starts the motor of the airplane 29. At the same time the assistant regulates the motor to cause its perfect operation. The airplane is resting on the deck 1 while this starting action is taking place, and when the assistant releases the plane it starts its travel in a circle over the deck and as the airplane gains sufficient speed the operator applies pressure to the control stick or grip 35 to cause the airplane to start to climb. After a few feet of altitude is gained the operator reels both tube or hose 19 and control wires 28 out to the desired distance. The spray valve 16 is then adjusted to cause the desired amount of spray, or powder to be discharged.

The assistant can, after launching the airplane, proceed to the edge of the deck to direct the operator with signals as the case may be.

In Figure 12 is shown this spraying apparatus working over a hill so as to treat the growth or vegetation on the hill. In this position the four legs 2 are adjusted to accommodate the apparatus to the uneven ground.

Figure 11:
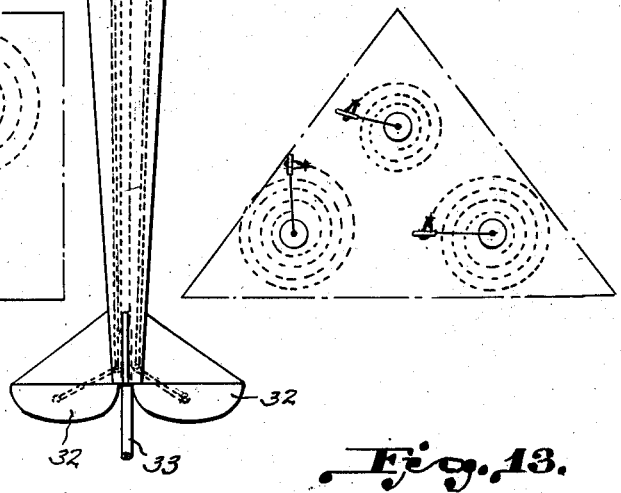
Figure 11 is a diagram showing partly in section the airplanes and the course of travel over a triangular support.

In Figure 11 the apparatus is shown as being positioned between two rows of citrus trees, preferably orange trees. In this position, the spraying apparatus is admirably adapted to spray the trees of the two contiguous rows.

Figure 9:
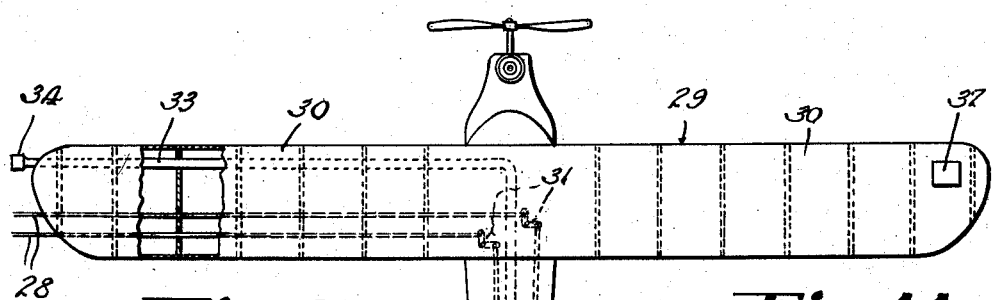
Figure 9 is a top plan view of the airplane.
Figure 10:
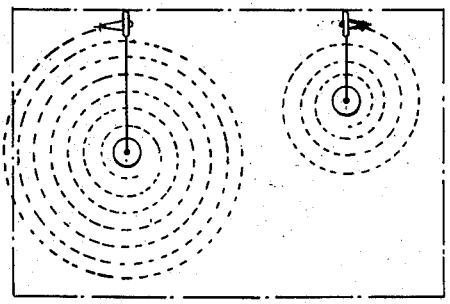
Figure 10 is a diagram showing partly in dotted lines two airplanes on a rectangular support.

Figure 9 shows a diagram of a rectangular positioning of two spraying apparatuses while in Figure 10 the positioning of the airplane is illustrated in a triangular position.

It is to be understood that it is optional with the operator whether the tank 10 contains powder or a liquid. The tank 10 is suitably connected to the pump 11. The motor 13 is suitably connected to the tank 12, and tank 12 is suitably connected to pump 11.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. The combination with a frame including a deck and legs supporting said deck, said legs being independently adjustable for length and having means for securing them in adjusted positions, of a source of spray supply supported on said frame, a motor driven airplane resting on said deck upon its motor being out of operation, a spray nozzle carried by said airplane, tubular connecting means leading from said spray supply to said spray nozzle, and means to control the effective length of said connecting means.

2. The combination with a frame including a deck and legs supporting said deck, said legs being independently adjustable for length and having means for securing them in adjusted positions, of a source of spray supply supported on said frame, a motor driven airplane resting on said deck upon its motor being out of operation, a spray nozzle carried by said airplane, tubular connecting means leading from said spray supply to said spray nozzle, said connecting means including a flexible portion constituting a tether attaching the airplane to the frame, and means to control the effective length of the tether.

3. The combination with a frame including a deck and legs supporting said deck, of a source of spray supply supported on said frame, a motor driven airplane resting on said deck upon its motor being out of operation, a spray nozzle carried by said airplane, tubular connecting means leading from said spray supply to said spray nozzle, means to control the effective length of said connecting means, soaring and diving controlling means carried by said airplane, and means on said frame for controlling said soaring and diving means and having flexible and extensible connection therewith.

4. The combination with a frame including a deck and legs supporting said deck, of a source of spray supply supported on said frame, a motor driven airplane resting on said deck upon its motor being out of operation, a spray nozzle carried by said airplane, tubular connecting means leading from said spray supply to said spray nozzle, said connecting means including a flexible portion constituting a tether attaching the airplane to the frame, and means to control the effective length of the tether, soaring and diving controlling means carried by said airplane, and means on said frame for controlling said soaring and diving means and having flexible and extensible connection therewith.

5. The combination with a frame including a deck and legs supporting said deck, said legs being independently adjustable for length and having means for securing them in adjusted positions, of a source of spray supply supported on said frame, a motor driven airplane resting on said deck upon its motor being out of operation, a spray nozzle carried by said airplane, tubular connecting means leading from said spray supply to said spray nozzle, means to control the effective length of said connecting means, soaring and diving controlling means carried by said airplane, and means on said frame for controlling said soaring and diving means and having flexible and extensible connection therewith.

6. The combination with a frame including a deck and legs supporting said deck, said legs being independently adjustable for length and having means for securing them in adjusted positions, of a source of spray supply supported on said frame, a motor driven airplane resting on said deck upon its motor being out of operation, a spray nozzle carried by said airplane, tubular connecting means leading from said spray supply to said spray nozzle, said connecting means including a flexible portion constituting a tether attaching the airplane to the frame, means to control the effective length of the tether, soaring and diving controlling means carried by said airplane, and means on said frame for controlling said soaring and diving means and having flexible and extensible connection therewith.

JOHN HOLMES MURPHY.

REFERENCES CITED

The following references are of record in the file of this patent:

UNITED STATES PATENTS

| Number | Name | Date |
| --- | --- | --- |
| 1,497,555 | Donaldson et al. | June 10, 1924 |
| 1,514,602 | Charland | Nov. 11, 1927 |
| 1,869,487 | Lefevre et al. | Aug. 2, 1932 |
| 1,925,212 | Steiber | Sept. 5, 1933 |